United States Patent [19]

Ambrogio

[11] Patent Number: 5,746,800
[45] Date of Patent: May 5, 1998

[54] GLASS MAKING APPARATUS HAVING AUTOMATIC BLANK-MOLD SOOTING DEVICE

[75] Inventor: Morettin Ambrogio, Cinto Cao Maggiore, Italy

[73] Assignee: Avir Finanziaria S.p.A., Asti, Italy

[21] Appl. No.: 688,772

[22] Filed: Jul. 31, 1996

Related U.S. Application Data

[63] Continuation of Ser. No. 207,704, Mar. 9, 1994, abandoned.

[30] Foreign Application Priority Data

Oct. 11, 1993 [IT] Italy ................. PN93A0065

[51] Int. Cl.[6] ................. C03B 40/00; C03B 9/00
[52] U.S. Cl. ................. 65/169; 65/170; 65/229; 65/26; 65/29.1; 65/160; 249/114.1; 249/115; 427/577; 427/450; 427/580; 427/249
[58] Field of Search ................. 65/26, 29.1, 169, 65/170, 301, 68, 72, 214, 215, 219, 229, 82, 79, 160, 300, 323, 261, 262; 425/90, 96, 98; 249/114.1, 115; 427/577, 450, 580, 249

[56] References Cited

U.S. PATENT DOCUMENTS

| | | | |
|---|---|---|---|
| 1,535,149 | 4/1925 | Dostal | 118/47 |
| 3,141,752 | 7/1964 | Keller. | |
| 3,480,422 | 11/1969 | Lichok et al. | 65/169 |
| 3,981,711 | 9/1976 | Bjorkstrom | 65/26 |
| 4,402,721 | 9/1983 | Ericson et al. | 65/163 |
| 4,412,974 | 11/1983 | Nicolas et al. | 422/156 |
| 4,498,918 | 2/1985 | Seeman | 65/26 |
| 4,578,099 | 3/1986 | Hübner et al. | 65/169 |
| 4,648,893 | 3/1987 | Roux. | |
| 4,806,137 | 2/1989 | Virey. | |
| 5,120,341 | 6/1992 | Nozawa et al. | 65/26 |

FOREIGN PATENT DOCUMENTS

| | | |
|---|---|---|
| 903244 | 1/1986 | Belgium. |
| 0 022 385 | 1/1981 | European Pat. Off.. |
| 0 125 477 A1 | 11/1984 | European Pat. Off.. |
| 0 238 403 | 9/1987 | European Pat. Off.. |
| 0 368 267 A1 | 5/1990 | European Pat. Off.. |
| 0393554 | 10/1990 | European Pat. Off.. |
| 0 443 794 A1 | 8/1991 | European Pat. Off.. |
| 0 647 599 A1 | 4/1995 | European Pat. Off.. |
| 60-56756 | 12/1985 | Japan. |
| 61-72632 | 4/1986 | Japan. |
| 64-26344 | 2/1989 | Japan. |
| 2-295634 | 12/1990 | Japan. |
| 4-139032 | 5/1992 | Japan. |

*Primary Examiner*—Steven P. Griffin
*Attorney, Agent, or Firm*—Oblon, Spivak, McClelland, Maier & Neustadt, P.C.

[57] ABSTRACT

A glass making apparatus adapted to deposit a lubricating/detaching layer of carbon black obtained from acetylene cracking on the internal walls of a blank mold (1, 18). The glass making apparatus includes a blank mold (1, 18) having an open top and an open bottom (10); a collar (6) sized, shaped, and positioned to selectively plug the open bottom (10) of the blank mold (1, 18) during a glass forming process and to disengage from the open bottom (10) of the blank mold (1, 18) during a blank mold sooting process; a ring (7) disposed in the collar (6); a plunger (8, 14) sized, shaped, and positioned to selectively move up into the collar (6) and down out of the collar (6); and a sleeve (9) surrounding the plunger (8, 14).

20 Claims, 3 Drawing Sheets

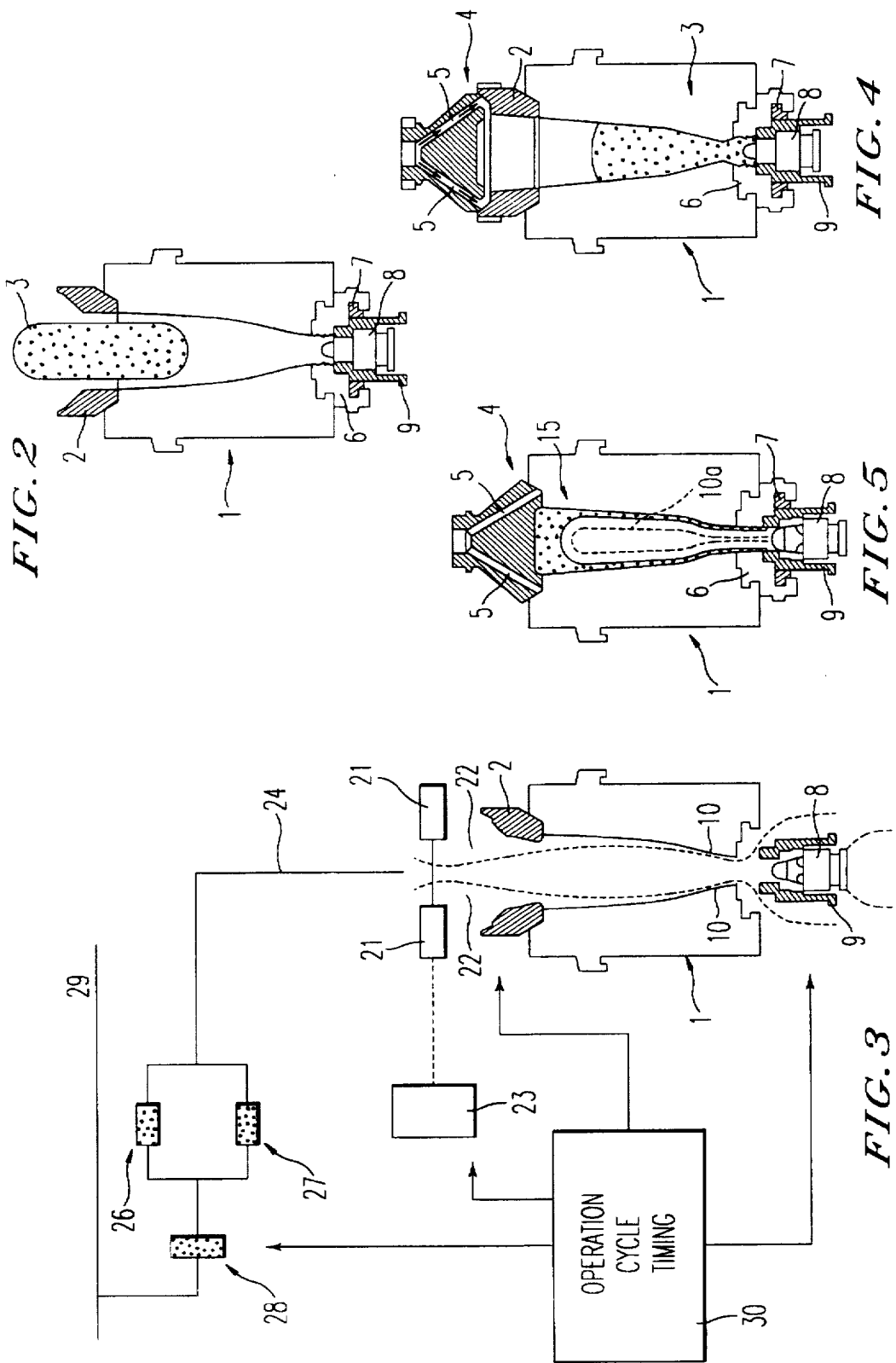

GLASS MAKING APPARATUS HAVING AUTOMATIC BLANK-MOLD SOOTING DEVICE

This application is a continuation of application Ser. No. 08/207,704, filed on Mar. 9, 1994, now abandoned.

FIELD OF THE INVENTION

The present invention relates to an automatic blank-mold sooting device for use in the glass making industry. The blank-mold sooting device is adapted to deposit a lubricating/detaching layer on the internal walls of the mold. The deposit is substantially made of carbon black, and the carbon black is obtained from an acetylene cracking process.

BACKGROUND OF THE INVENTION

It is well known that the high carbon content of acetylene and its property of exothermically decomposing into carbon and hydrogen make it an attractive raw material for conversion to carbon and that the carbon could represent a quite cheap and good lubricating material for some industrial requirements.

A problem, which has recurrently been encountered by hollow glassware making industries, concerns the necessity that a glass gob, which is injected into a blank mold, freely passes through the blank mold in such a way that its flow is not slackened by friction with the internal walls of the mold. It may also happen that a narrow portion of the glass gob meets with difficulties during the process of loading the glass gob into the blank mold, due to a partial gob adhesion to the walls of the mold. Consequently, the temperature distribution on internal mold walls becomes substantially irregular, whereby the blanked glassware becomes irregular, too. Indeed, as the blanked glassware is transferred to the blow mold, an air flow is injected thereinto (so that the glassware is formed into a definitive shape), and the air flow acts more intensively on the bottle portions which are hotter than the others. Furthermore, the hotter portions, which are more plastic than the cooler portions, are caused to get thinner than the cooler portions, with all the apparent drawbacks.

Till not long ago, a lubricating/detaching film on the internal mold walls was manually applied by means of a brush or similar device, by spreading a mixture of oil and graphite into the mold. However, each operator did not always follow the specifications relating to the amount of mixture as well as of the frequency of such an operation, with the result that a not uniform distribution of graphite made the blanked glass not regularly cooled. Consequently the glass gob was not freely loaded into the mold. In addition, the mold would rapidly get dirty from the graphite, whereby every 8–9 hours the operation cycle required a cleaning process. Moreover, the risk for the operator, regarding possible injuries during mold lubrication, can't be forgotten. Finally, the environment was polluted by oil combustion.

For these reasons, different technological solutions were sought for, particularly solutions involving the acetylene black process, since that process is adapted to deposit a lubricating/detaching layer of carbon black on the internal mold walls. A pilot flame is provided which is able to ignite the acetylene flow at a well defined moment of the operation cycle—not during every operation cycle, but just once every n cycles—according to the specifications of glassware to be obtained. In this way, the acetylene black process is able to coat the internal walls of blank molds. However, this solution has some drawbacks, too. Indeed:

heat produced by pilot flame heats the environment around the blank mold, whereby the operator is working in difficult conditions;

the pilot flame is fed by oxygen and methane, the cost of which is nearly equal to 60% of the overall energy costs of a hollow glass forming plant;

oxygen and methane, which feed the pilot flame, are able to oxidize acetylene, whereby the carbon black which coats the internal mold walls can lose its properties which are listed in the specifications;

some portions of the blank mold are oxidized instead of lubricated by the pilot flame feeder, whereby those portions could slacken the loading process of the gob into the blank mold; sometimes the blank mold supports are blocked, due to overheating produced by pilot flame; and, last but not least, the acetylene black process provides a collar in the bottom of the blank mold, which collar closes the bottom air-tightly, whereby the flame which is fed by acetylene is not allowed to reach the mold bottom, because it reverberates the flame, whereby not all the portions of the internal mold walls can be coated by a substantially uniform lubricating coat.

The problem which the device according to the invention intends to solve is mainly given by a solution, which allows acetylene black to arrive up to the bottom of the blank mold, in order to obtain a substantially uniform and complete coating of acetylene black on all the portions of the internal blank mold, whereby the glassware forming process can operate in a simple and correct way.

SUMMARY OF THE INVENTION

The problem is solved by a device according to the invention, which is characterized by plugging means (6, 7, 8, 9) of a bottom (10) of the blank mold (1). The plugging means (6, 7, 8, 9) is adapted to disengage the bottom (10) during a blank mold sooting process, whereby the lubricating/detaching layer can be deposited substantially on all portions of the blank mold internal walls, enabling a glass gob (3) to freely flow along the internal walls.

BRIEF DESCRIPTION OF THE DRAWINGS

These and other features will be apparent from the following description and from the drawings, wherein:

FIG. 2 represents a sectional view, taken according to the axial development of a blank mold, when a glass gob drops into the blank mold;

FIG. 3 represents the same view of FIG. 2, taken during a sooting process;

FIG. 4 represents the same view of FIGS. 2, 3, where a glass gob reaches the bottom of the blank mold;

FIG. 5 represents the same view of FIGS. 2, 3, 4 where a glass gob is pre-formed into a parison in a blank mold;

DETAILED DESCRIPTION OF THE PRESENTLY PREFERRED EMBODIMENTS

Figure 1:
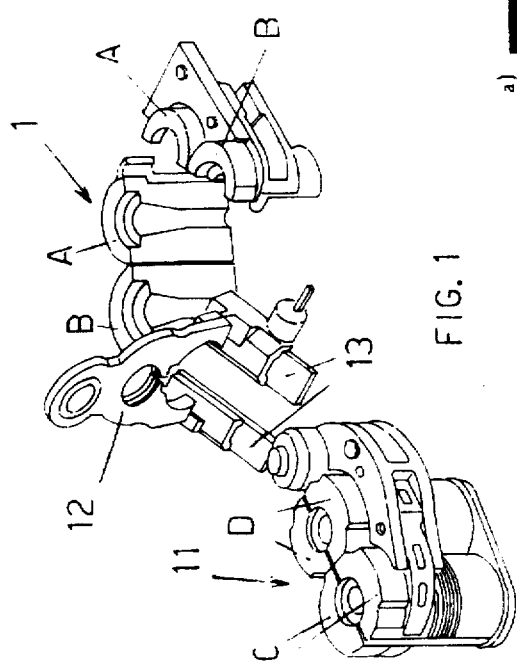
FIG. 1 represents a perspective schematic view of a hollow glassware forming plant.

The device according to the invention comprises a blank mold 1 (FIGS. 2, 3, 4, 5), which is represented in FIG. 1 as a two molds one-section machine, each one of the molds comprising two half portions, respectively A—A and B—B. The blank mold 1 has at its top a funnel 2 (FIGS. 2, 3, 4), which makes a glass gob 3 drop into the blank mold 1 (FIG. 2). As FIG.1 shows, four mold portions A—A-,B—B are opened in the drawing, whereas they are closed during a running operation, as will be apparent later on.

A baffle 4 is provided on the funnel 2 (FIG. 4) or directly on the top of the blank mold 1 (FIG. 5), depending on which phase the running operation is working in. The baffle 4 internally contains some channels 5, through which air is blown into the blank mold 1, as will be explained later on.

A collar 6 is provided at the bottom of the blank mold 1 and, like the blank mold 1, it is made of two portions. Within a ring slit of the collar 6, a ring 7 is fitted, which is a single piece. The ring 7 presents a seat, inside which a plunger 8 is adapted to slide (FIGS. 2, 3, 4, 5).

A bottom 10 represents the lowest portion of the blank mold 1. The collar 6, the ring 7, and the plunger 8 represent means for plugging the bottom 10.

A sleeve 9 contains a hole in which the plunger 8 is adapted to slide. The sleeve 9, as will be apparent hereinafter, is adapted to follow a parison (i.e., a pre-formed glass) 15 which will be successively finished in a blow mold 11. The blow mold 11 is represented in FIG.1 in a position where two portions C—C-,D—D (which correspond to the two portion A—A-,B—B of blank mold 1) are closed.

The parison 15 is produced thanks to a so-called "counter-blow air", which is represented in FIG. 5 by a dashed line 10a. The counter-blow air is blown from the bottom 10 through an internal channel (not represented in the drawings) of the plunger 8.

The parison 15 is adapted to be transferred, as will be apparent later on, from the blank mold 1 to blow mold 11 by means of an invert, which is represented in FIG. 1 by an arm 12, connected to two supports 13.

Figure 8:
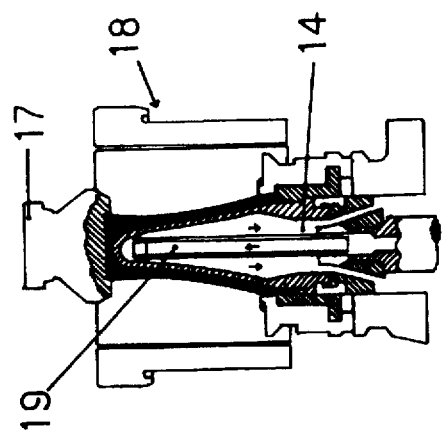
FIGS. 6, 7, 8 represent three following phases of a glass gob forming process in a blank mold, where a plunger and not an air blow pre-forms a glass gob into a parison.
Figure 7:
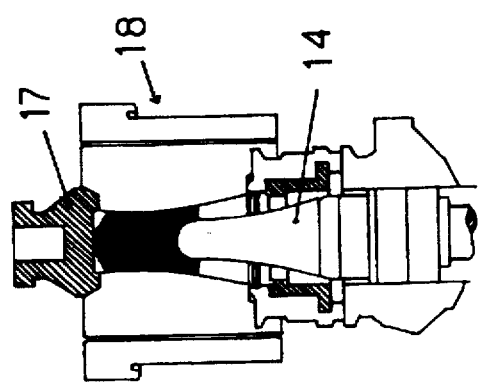
Figure 6:
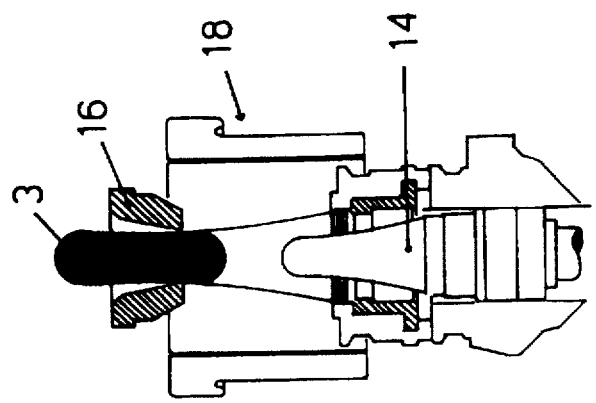

The plunger 8 of FIGS. 2, 3, 4, 5 can assume a shape of a plunger 14 of FIGS. 6, 7, 8 whenever the glass gob 3 is pre-formed, not by blown air, but by the action of the plunger 14.

FIG. 6 shows the presence of a funnel 16, which is similar to the funnel 2 of FIGS. 2, 3, whereas a baffle 17 plays the same role as the baffle 4 of FIGS. 4, 5. The plunger 14 is adapted to assume at least three different positions: a lower position, as long as the glass gob 3 drops through the funnel 16 of a blank mold 18; an intermediate position, which corresponds to the running operation, when the baffle 17 matches to the blank mold 1, where the baffle 17 serves as a sealing device; and an upper position, where the glass gob 3 is formed into a definitive shape 19 by the plunger 14.

Above the funnel 2 of FIG. 3, a support 21 for two electrodes 22 is provided. The two electrodes 22 are controlled by a device 23. The device 23 is adapted, as it will be explained later on, to generate sparks, in a way known per se and at a definite time in the running operation cycle, between the electrodes 22. The sparks in turn cause a piezoelectric ignition of the fuel. The support 21, the electrodes 22, and the device 23 represent electrical ignition sparking means of device according to the invention.

It is apparent that ignition of the fuel could also be electrically obtained, in a way known per se, by means of a voltaic arc or of an electric resistance, not represented in the drawings.

The device 23 is controlled, in a way known per se, by operation cycle timing means as schematically represented of 30 in FIG. 3. The operation cycle timing means are, among other things, adapted to decide the choice of one active cycle every n operating cycles, depending on the plant type and on the glassware type to be manufactured.

Also, the positioning of the components 21, 22, 23, 24 on each blank mold 1, in correspondence of each process of sooting the blank mold 1, is committed to the operation cycle timing means.

The flow of acetylene is controlled by pressure modulation means, which are represented by a solenoid valve 26. Another solenoid valve 27 secures, as will be explained later on, full pressure acetylene feeding in a pipe 24. A valve 28 controls acetylene flow from a main pipe 29. The solenoid valve 26 is activated whenever an automatic blank mold sooting process is going to start, by throttling the main pipe 29 and allowing it to supply a reduced, at low pressure, acetylene flow. Substantially at the same moment (i.e., when acetylene flow is starting), the electrodes 22 are sparked, and, after a split second (preferably after approximately 1/10 sec.), the solenoid valve 27 intervenes, which is able to feed the pipe 24 at full pressure.

Each solenoid valve 26, 27 is connected to a tap, not represented in the drawings, for the manual control of the acetylene flow.

The operation cycle timing means are not only in charge of positioning the support 21, the electrodes 22, and the device 23 above each blank mold 1, but also of controlling the sparking of the electrodes 22 (FIG. 3) at the exact moment when the acetylene flow is starting. In addition, the operation cycle timing means are adapted to control the solenoid valves 26, 27, opening and closing of the blank mold 1, opening and closing of the blow mold 11, and operation of the invert (arm) 12.

As for the blank mold 1, the operation cycle timing means control the positioning of the funnel 2, the dropping of the glass gob 3 through the funnel 2, the positioning of the baffle 4 on the funnel 2, the intervening of the collar 5 and the ring 7, and the motion of the plunger 8 in the sleeve 9.

Figure 9:
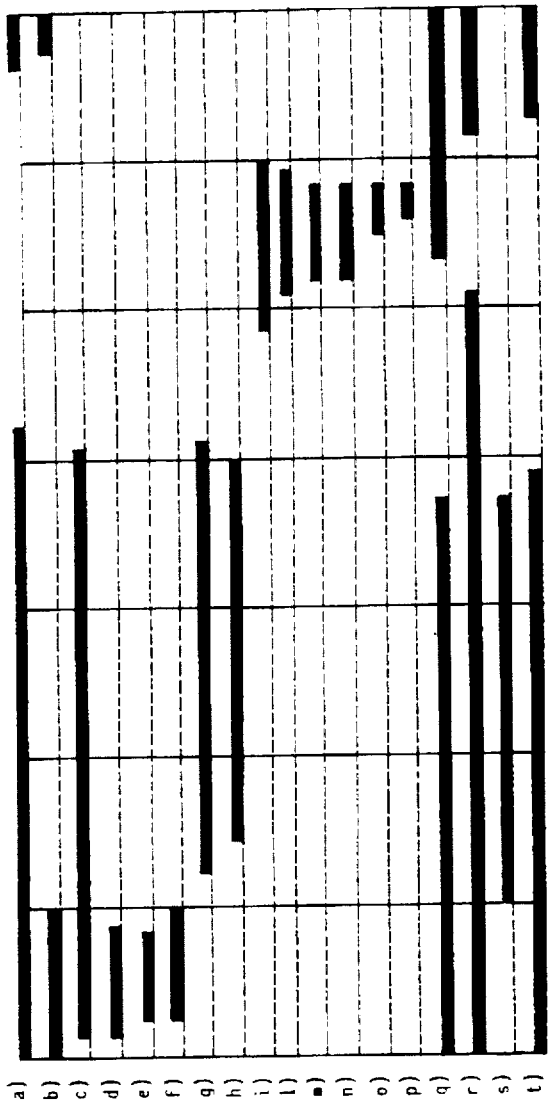
FIG. 9 represents a synthetic table, which describes the sequence of the phases in an operation cycle of the device according to the invention.

It should also be noted that the operation cycle timing means control the sequence of the phases in an operation cycle of device according to the invention. In order to better understand the sequence, all phases of the operation cycle are synthetically listed in the table of FIG. 9, in which the cycle is extended to an operation dimension of 360° C. In detail:

a) line represents the blank mold 1 closing;

b) line represents the funnel 2 coming downwards;

c) line represents the sleeve 9 coming upwards;

d) line represents the plunger 8 coming upwards;

e) line represents the baffle 4 coming downwards;

f) line represents the air blowing pre-forming phase;

g) line represents the baffle 4 coming downwards;

h) line represents the counter-air blowing into the blank mold 1;

i) line represents the collar 6 inversion with the pre-formed parison;

l) line represents the second closing of the blank mold 1;

m) line represents the funnel 2 coming downwards;

n) line represents the active positioning of the sooting means;

o) line represents activation of the sooting means;

p) line represents steady feeding of the sooting means;

q) line represents closing of the blow mold 11;

r) line represents the revert phase of the arm 12;

s) line represents the final air blowing into the blow mold 11; and t) line represents bottle take-out from the blow mold 11.

The operation cycle of the device according to the invention starts immediately before the glass gob 3 drops into the blank mold 1. Exactly at this moment (equal to 0° of the running cycle), the two portions A—A and B—B (FIG. 1) close and the funnel 2 is positioned on the blank mold 1 top (FIG. 2). After a few degrees (i.e., after the glass gob 3 drops into the blank mold 1), the sleeve 9 is moved upwards in such a way that the plugging means (6, 7, 8, 9) are activated, closing the bottom 10. Therefore, when the glass gob 3 reaches the bottom 10, it can't leave it (FIG. 4).

Now, the operation cycle timing means controls, in a way known per se, the positioning of the baffle 4 on the funnel 2. Settle air is blown through the channels 5 of the baffle 4. All of this is for ensuring that the glass gob 3 reaches the bottom 10.

At approximately 60° of the operation cycle, the baffle 4 is removed, funnel 2 moves out, and the baffle 4 comes down again—this time covering the blank mold 1, where it serves as a sealing device (FIG. 5).

At approximately 75° degrees of the running cycle, counter-air is blown from the bottom 10, because, just a bit earlier (at 44° of the running cycle), the plunger 8 came down, so that counter-blow air 10a can pre-form the parison 15.

At approximately 200° of the running cycle, the sleeve 9 is moved down, the baffle 4 is removed, and the blank mold 1 is opened into two portions A—A and B—B, so that the parison 15 can be transferred to the blow mold 11. During the transfer operation, the collar 6 and the ring 7 join the parison 15. Consequently, the collar 6 and the ring 7 leave the bottom 10 in such a way that the plugging means are no longer active.

Immediately afterwards, the blank mold 1 closes again, and the funnel 2 is positioned on the blank mold 1, so that the sooting means can start working (if the n cycles, planned by the operation cycle timing means, have elapsed). Therefore, if a sooting cycle is planned, all proceeds as will explained later on. Otherwise, the operation cycle proceeds, and no sooting device is activated. However, a sooting cycle is, of course, planned in a subsequent operation cycle.

If a sooting cycle is planned, the blank mold 1 appears as in FIG. 3, in which the plunger 8 is lowered nearly one inch with respect to its blank mold plugging position. In addition, neither the collar 6 nor the ring 7 is present—because, as stated earlier, they had been transferred by the invert (arm) 12, and they are integral with the parison 15 at the blow mold 11. The automatic sooting device is, at first, positioned, in a way known per se, above each blank mold 1, together with the support 21, the electrodes 22, the device 23, and the pipe 24.

The device 23 controls the piezoelectric ignition of acetylene flow by means of the electrodes 22, the gap between which is such as to avoid disruption of the acetylene flow. For this purpose, the solenoid valve 26 allows, during a first period, a reduced acetylene flow through the pipe 24, in such a way that piezoelectric ignition is not perturbed by an initially too strong acetylene flow. However, immediately upon spark ignition, the solenoid valve 27 allows full flow feeding of the acetylene. Pick-up and drop-out of the solenoid valves 26,27 are controlled by the operation cycle timing means.

The acetylene flow involves, thanks to the piezoelectric ignition, all internal walls of the blank mold 1, particularly the bottom 10 of the blank mold 1, by depositing a lubricating/detaching layer. The deposit also involves the internal walls of the funnel 2, allowing the glass gob 3 to drop freely in a substantially correspondence to the blank mold center. In the prior art, in the case of the presence of a pilot flame, it could happen that the glass gob 3 could be slacked by oxides, which are produced by the same pilot flame and which are deposited on the internal walls of the funnel 2. However, in the device according to the invention, thanks to the lubrication of the walls of the funnel 2, the glass gob 3 drops into the blank mold 1, with no slackening in correspondence of the walls of the funnel 2, whereby an efficiency increase of the forming process can be obtained, as well as a better uniformity of the thickness of the manufactured hollow glassware.

In addition, as FIG. 3 shows, the flame, which is obtained thanks to acetylene cracking, involves the internal side walls of the blank mold 1 and, after reaching the bottom 10, leaves the blank mold 1 by flushing along the sleeve 9, both externally and internally. The plunger 8, which lowers about one inch with respect to its closed position (FIG. 4), allows this. Just before the piezoelectric sparking of the electrodes 22, the blow mold 11 closes, and then the revert phase is activated—i.e., reversal of the arm 12 to the blank mold 1 is actuated. Finally, the last blow into the blow mold 11 and the take-out of the formed bottle are operated.

If the blank mold 18 of FIGS. 6, 7, 8 is considered, the plunger 14 (and no counter-blow into the blank mold 1) produces pre-formed bottle. Everything proceeds as described in the previous phases, with the exception that no air blow from the top is provided, whereas air blow from the bottom (FIG. 8) has the substantial task of cooling the plunger 14, after manufacturing pre-formed glassware. The funnel 16 plays the same role as the funnel 2 in FIGS. 2, 3, whereas the baffle 17, after positioning it on the blank mold 18, is not required to co-operate with the funnel 16, as opposed to what FIG. 4 shows, where the blank mold 1 operates with the funnel 2.

It is apparent that the acetylene black process operates for the blank mold 18 in the same way as for the blank mold 1 (FIG. 3). It is sufficient to imagine some redrafts to FIG. 6, where the glass gob 3 disappears, the plunger 14 lowers nearly one inch, and the sooting device, which comprises components 21, 22, 23, 24, 26, 27, 28, is positioned above the funnel 16. All the phases of the acetylene black process will be repeated also in this case, in a substantially similar way, as it was already described for the blank mold 1.

From the foregoing description of how the device and the method work, some considerations arise which should be pointed out. Indeed, with respect to well known plants, device according to the invention presents the following differential elements:

the sooting device operates as long as the plugging means is not operating—i.e., as long as the collar 6 and ring 7 are absent, because they were previously transferred by the invert (arm) 12 towards the blow mold 11. In addition, the plunger 8 lowers with respect to its normal position during the sooting process. All these facts allow all the internal walls of the blank mold 1, and particularly the bottom 10, to be coated by acetylene black, as the frame and the sooting are not reverberated by plugging means. In such a way, plant efficiency and productivity can increase, as scraps, due to the miss-shaped glassware, are reduced to a minimum;

the acetylene black process, which is due to automatic sooting means, is interesting to be analyzed. With respect to well known plants, there is now no pilot flame, as ignition is due to piezoelectric sparking means (produced by the device 23) which are controlled by the timing means. As already stated, the piezoelectric solution of the sparking means could be substituted by a voltaic arc or on electrical resistance solution.

So, all drawbacks due to the presence of pilot flame are avoided, including drawbacks which are technical, economical, and connected to environment related conditions; particularly, a substantial reduction of costs of energy, which is consumed in a hollow glass forming plant, is obtained; in addition, production speed can be improved together with a decrease of bottle weight, thanks to its better thickness uniformity;

the gap between the electrodes 22 allows acetylene flow not to encounter any obstacle along its way, except the ignition spark produced by the electrodes 22. It is indeed an ignition of piezoelectric type, which substantially intervenes in the same moment, when acetylene starts flowing from the pipe 24. At first, acetylene is fed at a substantially reduced pressure with respect to a normal pressure, thanks to the solenoid valve 26, which controls a quite short initial bottleneck. In such a way, risk that the spark is not started immediately after acetylene flows from the pipe 24 is avoided. Then, starting from the moment when acetylene is fed at a normal pressure, the flame burns in a stable way. So, risk that the spark is not going to start immediately after acetylene flows from the pipe 24 at full pressure is avoided.

These and further advantages will be apparent from the description of the device according to the invention and from the appended claims. It should, however, be pointed out that the description is of the preferred embodiments, but the invention extends obviously to all embodiments, which are comprised in the field of invention, if they are substantially similar to the described operating devices.

I claim:

1. Glass making apparatus adapted to deposit a lubricating/detaching layer of carbon black obtained from acetylene cracking on the internal wall of a blank mold, said glass making apparatus comprising:
   (a) a blank mold having an open top and an open bottom;
   (b) a collar disposed adjacent to the open bottom of said blank mold during a glass forming process;
   (c) a ring disposed in said collar;
   (d) a plunger movable between at least first and second positions, wherein in said first position said plunger is positioned and arranged with respect to said collar and said blank mold such that said open bottom of said blank mold is closed by said plunger and said collar, and wherein in said second position of said plunger an interior of said blank mold communicates with an exterior of said blank mold through said open bottom of said blank mold and through a space between said plunger and said open bottom of said blank mold;
   (e) a sleeve surrounding said plunger;
   (f) means for providing an acetylene flame while said plunger is in said second position such that the acetylene flame enters said top of said blank mold and leaves said blank mold through the open bottom of said blank mold and through said space between the open bottom of said blank mold and said plunger, whereby said means for providing an acetylene flame performs a sooting process to deposit a lubricating/detaching layer of carbon black in a substantially uniform way on all portions of the internal wall of said blank mold, allowing glass gobs to flow freely along the internal wall of said blank mold; and
   (g) operation cycle timing means for controlling said means for providing an acetylene flame and for controlling movement of said plunger such that said plunger is in said second position during the sooting process.

2. Glass making apparatus as recited in claim 1 and further comprising a counter-blower for air to pre-form a parison when said plunger is disposed outside of said collar.

3. Glass making apparatus as recited in claim 1 and further comprising:
   (a) a blow mold; and
   (b) an invert device adapted to transfer said collar, said ring, and the a parison from said blank mold to said blow mold.

4. Glass making apparatus as recited in claim 3, wherein said invert device is controlled by said operation cycle timing means which also controls the sequence of the functional operations of said blank mold and said blow mold.

5. Glass making apparatus as recited in claim 4 and further comprising:
   (a) a funnel mounted for movement relative to the open top of said blank mold such that said funnel is selectively moved to a location adjacent the open top of said blank mold to assist in depositing of a gob in the blank mold;
   (b) a support; and
   (c) wherein said means for providing an acetylene flame includes piezoelectric electrodes mounted on said support, wherein said support is mounted for movement relative to the open top of said blank mold to selectively position the piezoelectric electrodes at a location above said open top of said blank mold, wherein:
   (d) movement of said support and operation of said piezoelectric electrodes are controlled by said operation cycle timing means.

6. Glass making apparatus as recited in claim 5, wherein said means for providing an acetylene flame provides a flow of acetylene and wherein:
   (a) said piezoelectric electrodes control piezoelectric ignition of the acetylene flame;
   (b) there is a gap between said piezoelectric electrodes; and
   (c) the gap between said piezoelectric electrodes is sized, shaped, and positioned so as not to interfere with the flame of acetylene provided by said means for providing an acetylene flame.

7. Glass making apparatus as recited in claim 1, wherein said sleeve comprises:
   (a) an interior within which said plunger is movably disposed;
   (b) an external surface; and
   (c) wherein an acetylene flame provided by said means for providing an acetylene flame extends over said external surface during said sooting process.

8. Glass making apparatus as recited in claim 1, wherein said plunger is sized and shaped to mold an interior of a parison.

9. Glass making apparatus adapted to deposit a lubricating/detaching layer of carbon black obtained from acetylene cracking on the internal wall of a blank mold, said glass making apparatus comprising:
   (a) a blank mold having an open top and an open bottom:
   (b) a collar disposed adjacent to the open bottom of said blank mold during a glass forming process;

(c) a ring disposed in said collar;

(d) a plunger movable between at least first and second positions wherein in said first position said plunger is positioned and arranged with respect to said collar and said blank mold such that said open bottom of said blank mold is closed by said plunger and said collar, and wherein in said second position of said plunger an interior of said blank mold communicates with an exterior of said blank mold through said open bottom of said blank mold and through a space between said plunger and said open bottom of said blank mold;

(e) a sleeve surrounding said plunger;

(f) means for providing an acetylene flame while said plunger is in said second position such that the acetylene flame enters said top of said blank mold and leaves said blank mold through the open bottom of said blank mold and through said space between the open bottom of said blank mold and said plunger, whereby said means for providing an acetylene flame performs a sooting process to deposit a lubricating/detaching layer of carbon black in a substantially uniform way on all portions of the internal wall of said blank mold, allowing glass gobs to flow freely along the internal wall of said blank mold;

wherein said means for providing an acetylene flame includes means for providing a flow of acetylene comprising:

(g) a first pipe which, during use of said glass making apparatus, contains acetylene;

(h) a second pipe which leads from said first pipe to the top of said blank mold; and (i) pressure modulation means located in said second pipe and adapted:

(1) to be actuated whenever a blank mold automatic sooting process is going to start and (2) to throttle said first pipe so as to allow it to supply a reduced flow of acetylene to the top of said blank mold, and:

(j) operation cycle timing means for controlling said pressure modulation means.

10. Glass making apparatus adapted to deposit a lubricating/detaching layer of carbon black obtained from acetylene cracking on the internal wall of a blank mold, said glass making apparatus comprising:

(a) a blank mold having an open top and an open bottom;

(b) a collar disposed adjacent to the open bottom of said blank mold during a glass forming process;

(c) a ring disposed in said collar;

(d) a plunger movable between at least first and second positions wherein in said first position said plunger is positioned and arranged with respect to said collar and said blank mold such that said open bottom of said blank mold is closed by said plunger and said collar, and wherein in said second position of said plunger an interior of said blank mold communicates with an exterior of said blank mold through said open bottom of said blank mold and through a space between said plunger and said open bottom of said blank mold;

(e) a sleeve surrounding said plunger;

(f) means for providing an acetylene flame while said plunger is in said second position such that the acetylene flame enters said top of said blank mold and leaves said blank mold through the open bottom of said blank mold and through said space between the open bottom of said blank mold and said plunger whereby said means for providing an acetylene flame performs a sooting process to deposit a lubricating/detaching layer of carbon black in a substantially uniform way on all portions of the internal wall of said blank mold, allowing glass gobs to flow freely along the internal wall of said blank mold;

wherein:

(g) said means for providing an acetylene flame includes electrical ignition means for igniting the acetylene flame; and (h) wherein the glass making apparatus further includes operation cycle timing means controlling timing of ignition by said electrical ignition means, and wherein said operation cycle timing means further controls timing of movement of said plunger such that said plunger is in said second position during the sooting process.

11. Glass making apparatus as recited in claim 10 and further comprising:

gas supply control means for controlling supply of acetylene to said means for providing an acetylene flame, such that a first flow of acetylene is provided during ignition by said electrical ignition means, and wherein after ignition by said electrical ignition means said gas supply control means provides a second flow of acetylene which is greater than said first flow.

12. Glass making apparatus as recited in claim 10, wherein said electrical ignition means includes means for providing a piezoelectric ignition of said acetylene flame.

13. Glass making apparatus adapted to deposit a lubricating/detaching layer of carbon black obtained from acetylene cracking on the internal wall of a blank mold, said glass making apparatus comprising:

(a) a blank mold having an open top and an open bottom;

(b) a collar which is selectively positioned at the open bottom of said blank mold;

(c) means for providing an acetylene flame at the top of said blank mold such that said acetylene flame enters said top of said blank mold and extends into said blank mold to perform a sooting process to deposit a lubricating/detaching layer of carbon black on the internal wall of said blank mold, allowing glass gobs to flow freely along the internal wall of said blank mold, said means for providing an acetylene flame comprising:

(i) means for providing a flow of acetylene gas at a location adjacent to the top of said blank mold and (ii) electrical ignition means for igniting a flow of acetylene gas to provide an acetylene flame;

wherein:

(d) said electrical ignition means for igniting the acetylene gas includes:

(i) a first electrode (ii) a second electrode; and (iii) wherein said first and second electrodes are spaced with respect to one another and with respect to said flow of acetylene gas at the location adjacent to the top of the blank mold such that the flow of acetylene gas passes between the first and second electrodes and the first and second electrodes are not an obstacle to and do not interfere with the flow of acetylene gas;

wherein said means for providing a flow of acetylene gas includes gas supply control means for controlling supply of acetylene gas to the top of said blank mold, such that a first flow of acetylene is provided during ignition by said electrical ignition means, and wherein after ignition by said electrical ignition means said gas supply control means provides a second flow of acetylene which is greater than said first flow.

14. Glass making apparatus as recited in claim 13, further including operation cycle timing means for timing operation of said electrical ignition means and said gas supply control means.

15. Glass making apparatus as recited in claim 14, further comprising:

(a) a sleeve having an interior and an outer surface;

(b) a plunger at least partially disposed in said interior of said sleeve, said plunger movable between at least first and second positions;

wherein:

(c) when said plunger is in said second position a space is provided between said plunger and the bottom of said blank mold such that an interior of said blank mold communicates with an exterior of said blank mold through said space, and wherein said operation cycle timing means controls movement of said plunger such that said plunger is disposed in said second position during a sooting process, and further wherein said means for providing an acetylene flame provides an acetylene flame which extends through said blank mold, through said space and over said outer surface of said sleeve.

16. Glass making apparatus adapted to deposit a lubricating/detaching layer of carbon black obtained from acetylene cracking on the internal wall of a blank mold, said glass making apparatus comprising:

(a) a blank mold having an open top and an open bottom;

(b) means for providing an acetylene flame at the top of said blank mold to perform a sooting process to deposit a lubricating/detaching layer of carbon black on the internal wall of the blank mold;

(c) means for selectively closing and opening said open bottom of said blank mold such that when said open bottom is closed an interior of said blank mold does not communicate with an exterior of said blank mold through said open bottom, and such that when said open bottom is opened an interior of said blank mold communicates with an exterior of said blank mold through said open bottom of said blank mold during the sooting process; and (d) operation cycle timing means for controlling said means for selectively closing and opening such that during the sooting process said open bottom is opened and an acetylene flame of said means for providing an acetylene flame enters the open top of said blank mold and leaves the open bottom of said blank mold.

17. Glass making apparatus as recited in claim 16, wherein said means for providing an acetylene flame comprises:

(a) means for providing a flow of acetylene gas at a location adjacent to the top of said blank mold;

(b) electrical ignition means for igniting a flow of acetylene gas to provide an acetylene flame, said electrical ignition means having:

(i) a first electrode (ii) a second electrode; and (iii) wherein said first and second electrodes are spaced with respect to one another and with respect to said flow of acetylene gas at the location adjacent to the top of the blank mold such that the flow of acetylene gas passes between the first and second electrodes and such that the first and second electrodes are not an obstacle to and do not interfere with the flow of acetylene gas.

18. Glass making apparatus adapted to deposit a lubricating/detaching layer of carbon black obtained from acetylene cracking on the internal wall of a blank mold, said glass making apparatus comprising:

(a) a blank mold having an open top and an open bottom;

(b) a collar disposed adjacent to the open bottom of said blank mold during a glass forming process;

(c) a ring disposed in said collar;

(d) a plunger movable between at least first and second positions, wherein in said first position said plunger is positioned and arranged with respect to said collar and said blank mold such that said open bottom of said blank mold is closed by said plunger and said collar, and wherein in said second position of said plunger an interior of said blank mold communicates with an exterior of said blank mold through said open bottom of said blank mold and through a space between said plunger and said open bottom of said blank mold;

(e) a sleeve surrounding said plunger;

(f) means for providing an acetylene flame for performing a sooting process to deposit a lubricating/detaching layer of carbon black on an interior wall of said blank mold, wherein said means for providing an acetylene flame includes piezoelectric electrodes mounted on a support, and wherein said support is mounted for movement relative to the open top of said blank mold to selectively position the piezoelectric electrodes at a location above said open top of said blank mold; and (g) operation cycle timing means for controlling movement of said support and operation of said piezoelectric electrodes.

19. Glass making apparatus as recited in claim 18, wherein said means for providing an acetylene flame provides a flow of acetylene, and wherein said piezoelectric electrodes control piezoelectric ignition of the acetylene flame, and further wherein a gap is provided between said piezoelectric electrodes, with said gap sized, shaped, and positioned so as not to interfere with the flow of acetylene provided by said means for providing an acetylene flame.

20. Glass making apparatus as recited in claim 18, wherein said operation cycle timing means controls movement of said plunger such that said plunger is in said second position during the sooting process.

\* \* \* \* \*

UNITED STATES PATENT AND TRADEMARK OFFICE
CERTIFICATE OF CORRECTION

PATENT NO. : 5,746,800
DATED       : May 5, 1998
INVENTOR(S) : Ambrogio MORETTIN It is certified that error appears in the above-indentified patent and that said Letters Patent is hereby corrected as shown below:

On the title page, Item [75], the Inventor's name, is incorrect. It should read:

-- Ambrogio MORETTIN --

Signed and Sealed this

Twenty-seventh Day of October, 1998

Attest:

BRUCE LEHMAN

Attesting Officer

Commissioner of Patents and Trademarks